(12) United States Patent
Mallick et al.

(10) Patent No.: US 7,860,306 B2
(45) Date of Patent: Dec. 28, 2010

(54) METHOD FOR EDITING MULTI-CHANNEL IMAGES

(75) Inventors: Satya P. Mallick, La Jolla, CA (US); David J. Kriegman, San Diego, CA (US); Todd E. Zickler, Cambridge, MA (US); Peter N. Belhumeur, New York, NY (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/705,554

(22) Filed: Feb. 12, 2010

(65) Prior Publication Data

US 2010/0142804 A1    Jun. 10, 2010

Related U.S. Application Data

(63) Continuation of application No. 11/471,091, filed on Jun. 19, 2006, now Pat. No. 7,689,035.

(60) Provisional application No. 60/797,947, filed on May 5, 2006, provisional application No. 60/691,251, filed on Jun. 17, 2005.

(51) Int. Cl.
*G06K 9/00* (2006.01)
(52) U.S. Cl. .................................... 382/163
(58) Field of Classification Search ................. 382/162, 382/167, 190; 345/581, 589
See application file for complete search history.

(56) References Cited

U.S. PATENT DOCUMENTS

| 5,850,472 | A | 12/1998 | Alston et al. |
| 6,697,518 | B2 | 2/2004 | Belhumeur et al. |
| 6,853,745 | B1 | 2/2005 | Jacobs et al. |

(Continued)

OTHER PUBLICATIONS

Federici, "Noninvasive light-reflection technique for measuring soft-tissue stretch", Applied Optics, Nov. 1999, 6653-6660, vol. 38(31).

(Continued)

*Primary Examiner*—Jose L Couso
(74) *Attorney, Agent, or Firm*—Eleanor M. Musick; Procopio, Cory, Hargreaves & Savitch, LLP

(57) ABSTRACT

The present invention presents a framework for separating specular and diffuse reflection components in images and videos. Each pixel of the an M-channel input image illuminated by N light sources is linearly transformed into a new color space having (M–N) channels. For an RGB image with one light source, the new color space has two color channels (U,V) that are free of specularities and a third channel (S) that contains both specular and diffuse components. When used with multiple light sources, the transformation may be used to produce a specular invariant image. A diffuse RGB image can be obtained by applying a non-linear partial differential equation to an RGB image to iteratively erode the specular component at each pixel. An optional third dimension of time may be added for processing video images. After the specular and diffuse components are separated, dichromatic editing may be used to independently process the diffuse and the specular components to add or suppress visual effects. The (U,V) channels of images can be used as input to 3-D shape estimation algorithms including shape-from-shading, photometric stereo, binocular and multinocular stereopsis, and structure-from-motion.

61 Claims, 6 Drawing Sheets

U.S. PATENT DOCUMENTS

| | | |
|---|---|---|
| 7,062,419 B2 | 6/2006 | Grzeszczuk et al. |
| 7,689,035 B2 * | 3/2010 | Mallick et al. ............. 382/163 |
| 2007/0132759 A1 | 6/2007 | Mallick et al. |

OTHER PUBLICATIONS

Lin, "Diffuse-Specular Separation and Depth Recovery from Image Sequences", European Conf. on Comp. Vision (ECCV 2002) Copenhagen, May 28-31, 2002, Part III, 210-224.

Mallick, "Beyond Lambert: Reconstructing Specular Surfaces Using Color", Proc. IEEE Conf. Comp. Vision & Patt. Recog., Jun. 2005.

Mallick, "Specularity Removal in Images and Videos: A PDE Approach", Proc. Eur. Conf. Comp. Vision, Berlin, May 2006, Part I, 550-563.

Nayar, "Separation of Reflection Components Using Color and Polarization", Int. J. Comp. Vision, 1997, 163-186, vol. 21(3), Kluwer Academic Publishers.

Tan, "Separating Reflection Components Based on Chromaticity and Noise Analysis", IEEE Trans. Patt. Analysis and Mach. Intel., Oct. 2004, 1373-1381, vol. 26(10).

Tan, "Separating Reflection Components of Textured Surfaces using a Single Image", IEEE Trans. Patt. Analysis and Mach. Intel., Feb. 2005, 178-193, 27(2).

Tsumura, "Medical Vision: measurement of skin absolute spectral-reflectance-image . . . ", Proc. Int. Conf. Multispect. Color Sci., 2001, 25-28.

Zickler, "Color Subspaces as Photometric Invariants", Proc. IEEE Conf. Comp. Vision and Patt. Recog., Jun. 2006, pp. 1-8.

Zickler, "Helmholtz Stereopsis: Exploiting Reciprocity for Surface Reconstruction", Proc. Eur. Conf. Comp. Vision (ECCV 2002) Copenhagen, May 28-31, 2002, Part III, 869-883.

* cited by examiner

METHOD FOR EDITING MULTI-CHANNEL IMAGES

RELATED APPLICATIONS

This application is a continuation of U.S. application Ser. No. 11/471,091, filed Jun. 16, 2006, which claims the benefit of priority of U.S. Provisional Application Ser. No. 60/797,947, filed May 5, 2006, and U.S. Provisional Application Ser. No. 60/691,251, filed Jun. 17, 2005, each of which is incorporated herein by reference in its entirety for all purposes.

GOVERNMENT RIGHTS

Pursuant to 35 U.S.C. §202(c), it is hereby acknowledged that the U.S. government has certain rights in the invention described herein, which was made in part with funds from National Science Foundation, Grants No. IIS-00-85864; IIS-03-08185; EIA-02-24431; and IIS-05-41173.

FIELD OF THE INVENTION

The present invention relates to methods for separating reflection components and removal of specularity components in images and videos, and a method for editing of video and still images by dichromatic separation.

BACKGROUND OF THE INVENTION

The reflectance of a textured materials, including plastics, plant leaves, cloth, wood, and human skin, can be described as a linear combination of diffuse and specular reflection components. When a scene fits this description, there are benefits to decomposing its image into the diffuse and specular components to facilitate computer analysis. The presence of highlights causes many algorithms in computer vision to produce erroneous results because most of these algorithms (e.g. stereo, optical flow, segmentation, tracking, and recognition) assume that the reflections from all surfaces are Lambertian (diffuse). In practice, non-Lambertian effects such as specular reflections are either ignored or treated as noisy measurements. By decomposing an image into its diffuse and specular components, powerful Lambertian-based computer vision algorithms can be successfully applied. In addition, the specular reflection component is helpful in determining the surface properties of the imaged object, and some computer algorithms rely solely on this component.

In addition to its uses in image analysis and computer vision, the separation of specular and diffuse components also has applications in photo editing and image-based modeling. In image-based modeling, for example, unless the illumination is carefully controlled when acquiring the images, the acquired texture maps often include undesirable artifacts due to specularities.

Computing a specular/diffuse separation is a difficult problem, and many methods have been proposed for separation of the two components, including optical methods, such as by the use of polarizing filters, and computer-based methods, such as color modeling. While many of the separation techniques have relied on global approaches, a few have proposed evaluation of local interactions. An advantage of the local approach is that it admits highly textured scenes that do not contain piecewise constant diffuse colors. In most local methods, the illuminant color is assumed to be known a priori, which is not a significant restriction because it can often be estimated using established global methods.

Reflectance is described by the bi-direction reflectance distribution function (BRDF). The BRDF is considered to be a five-dimensional function of wavelength and imaging geometry and can be written as $f(\lambda, \theta)$, where $\lambda$ is the wavelength of light and $\theta=(\theta_i, \phi_i, \theta_r, \phi_r)$ parameterizes the directions of the incoming irradiance and outgoing radiance (using spherical coordinates in the local coordinate system of a surface point). A Lambertian, or purely diffuse, surface is one whose BRDF is a constant function of $\theta$.

Reflection component separation in a single image started with the work of Shafer (*Color Research and Applications*, 10(4):210-218 (1985)), who introduced the dichromatic reflection model. The dichromatic model of reflectance is a special case of the BRDF model that was originally developed by Shafer to model dielectrics. The model assumes that the BRDF of the surface can be decomposed into two additive components: the interface (specular) reflectance and the body (diffuse) reflectance. Furthermore, it assumes that each of these two components can be factored into a univariate function of wavelength and a multivariate function that depends on the imaging geometry. That is, $$f(\lambda,\theta)=g_d(\lambda)f_d(\theta)+g_s(\lambda)f_s(\theta). \quad (1)$$

The functions $g_d(\lambda)$ and $g_s(\lambda)$ are respectively referred to as the diffuse and specular spectral reflectance and are intrinsic properties of the material. The functions $f_d$ (constant for Lambertian surfaces) and $f_s$ are the diffuse and specular BRDFs, respectively.

Specular reflection is due to light that is reflected at the surface without penetration, whereas diffuse reflection is due to light which penetrates the surface and is scattered (possibly multiple times) before being re-emitted. Since the index of refraction of most surfaces boundaries is uniform over the visible spectrum, the function $g_s(\lambda)$ is typically a constant function, and as a result, the specular color is often independent of the spectral reflectance of the surface and depends only on the spectral power distribution of the illumination and the spectral sensitivities of the sensors. Unlike the specular reflection, the diffuse reflection for these materials is highly color (or wavelength) dependent as the light that penetrates the surface is absorbed and scattered in a manner that may favor certain (colors) wavelengths and attenuate others. For these materials, the color of the diffuse reflectance is thus a product of the spectral reflectance of the surface in addition to the spectral power distribution of the illumination and the spectral sensitivities of the sensors. (See, e.g., M. F. Cohen and J. R. Wallace, *Radiosity and Realistic Image Synthesis*, Morgan Kaufmann, 1993.).

When this is case, and $g_s(\lambda)$ is a constant function, Equation 1 reduces to the common expression for the BRDF of a dichromatic surface, $$f(\lambda,\theta)=g_d(\lambda)f_d(\theta)+f_s(\theta) \quad (2)$$

where $f_s(\theta)=g_s(\lambda)f_s(\theta)$.

Taking into account the spectral power distribution (SPD) of a light source $L(\lambda)$ and a camera sensitivity function $C_k(\lambda)$, the image formation equation for a surface element with surface normal $\hat{n}$, illuminated by a light source with direction $\hat{l}$ is written per Equation (3)

$$I_k=(D_k f_d(\theta)+S_k f_s(\theta))\hat{n}\cdot\hat{l}, \quad (3)$$

where $D_k=\int C_k(\lambda)L(\lambda)g_d(\lambda)d\lambda$ and $S_k=\int C_k(\lambda)L(\lambda)d\lambda$. Under more general illumination distributions (as opposed to a point source) this is written $$I_k=\sigma_d D_k+\sigma_s S_k,$$

with $\sigma_d$ and $\sigma_s$ being referred to as the diffuse and specular geometric scale factors. Since it often encodes a simple relation between the lighting direction and the surface normal, the term $\sigma_d$ is said to encode "diffuse shading information".

In these equations, $S_k$ represents the effective source strength as measured by the $k^{th}$ sensor channel and is independent of the surface being observed. Similarly, $D_k$ is the effective albedo in the $k^{th}$ channel. For a multi-channel imaging device such as a color digital or video camera, there are typically three channels, while for a hyperspectral imaging devices device may have many more channels.

An RGB color vector $I=[I_1, I_2, I_3]^T=[I_R, I_G, I_B]^T$ from a typical color camera consists of three such measurements, each with a different sensitivity function with support in the visible spectrum. For notational simplicity, $S=[S_1, S_2, S_3]^T = [S_R, S_G, S_B]^T$ (with a corresponding definition for D), and since scale can be absorbed by $f_d$ and $f_s$, the assumption $\|D\|=\|S\|=1$ is made. The vectors S and D are called the specular color and diffuse color, respectively. In RGB color space a collection of color vectors from a dichromatic material under multiple view and illumination configurations (i.e., different values of $\theta$) which lie in a plane—the plane spanned by the effective source and body colors, S and D. This plane is referred to as the "dichromatic plane."

It has been observed that color vector in the dichromatic plane often cluster into the shape of a 'skewed-T', with the two limbs of the skewed-T formed by linear clusters of diffuse and specular pixels. When these limbs are sufficiently distinct, the diffuse and source colors can be recovered, the two components can be separated, and the highlights can be removed. In scenes consisting of a single surface material, this approach can be used to estimate a single "global" diffuse color, and in principle, this approach can be extended to cases in which an image is segmented into several regions of homogeneous diffuse color.

While this method works well for homogeneous, dichromatic surfaces in the noiseless case, there are three significant limitations that make it difficult to use in practice. First, many surfaces are textured and violate the homogeneous assumption.

Even when an image does contain homogeneous surfaces, a non-trivial segmentation process is required to identify them. Second, in order for the specular and diffuse limbs of the skewed-T to be distinct, the specular lobe must be sufficiently narrow (i.e., its angular support must be small relative to the curvature of the surface.) Finally, when the diffuse and specular colors are the same, there is no way to distinguish between the two components, and no color separation is possible. Some of these restrictions can be relieved, but not eliminated, by using additional cues such as polarization to estimate the source color at each point. (Nagar et al. (*Intl. J. Computer Vision,* 21(3): 163-186 (1997)).)

Related to these methods are a small number of color-based transformation methods that exploit knowledge of the illuminant to provide a partial dichromatic separation as opposed to an complete and explicit separation. Tan and Ikeuchi obtain a one-channel diffuse image through the transformation in Equation 4

$$I_d = \frac{3\max_k (I_k/S_k) - \sum_k (I_k/S_k)}{3\tilde{\lambda} - 1} \quad (4)$$

where $k \in \{1, 2, 3\}$, and the bounded quantity $1/3 < \tilde{\lambda} < 1$ is chosen arbitrarily. This transformation yields a positive monochromatic diffuse image, which can be seen by expanding Equation (1) using equation $(I_k=(D_k f_d + S_k f_s(\theta))\hat{n}\cdot\hat{l})$ and assuming that $I_1/S_1 > I_2/S_2, I_3/S_3$. In this case, Equation 5 is $$I_d = \frac{2I_1/S_1 - I_2/S_2 - I_3/S_3}{3\lambda - 1} = \frac{(2D_1/S_1 - D_2/S_2 - D_3/S_3)f_d \hat{n}\cdot\hat{l}}{3\lambda - 1}. \quad (5)$$

Since the expression is independent of $f$hd s and is directly related to $\hat{n}\cdot\hat{l}$, the positive image $I_d$ is specular-free and depends directly on diffuse shading information.

An alternate transformation is proposed by Park (*Intelligent Robots and Computer Vision XXI: Algorithms, Techniques, and Active Vision* (Proc. SPIE, Vol. 5267) pp. 163-174 (2003)). Park's transformation isolates two predominantly diffuse channels while retaining a similarity to HSI color space. The transformation is composed of a linear transformation $L_p$ and rotation $R_p$, and is written:

$$I_p = R_p L_p I, \text{ with } R_p L_p S = [0 \ 0 \ 2]^T \quad (6)$$

The matrices $R_p$ and $L_p$ are chosen such that the third color axis is aligned with the illumination color. As a result, that channel contains the majority of the specular component, leaving the other two channels to be predominantly diffuse.

BRIEF SUMMARY OF THE INVENTION

The present invention presents a unified framework for identifying and separating components in multi-channel (e.g., RGB) images and videos and using the separated components within processes such as shape estimation, image segmentation, motion estimation, and image editing. The multi-channel intensity at a point within such images and videos can be written as a linear combination of two components, the diffuse component and the specular component, that differ in color.

In one aspect, the present invention when applied to 3-channel color images is a method for projecting color vectors of an input image onto a two-dimensional subspace that is orthogonal to the source color. In the exemplary embodiment, each pixel of the RGB image is linearly transformed into a new color space (SUV) which results in two color channels that are free of specularities while the third channel contains both components.

In another aspect of the invention, a partial differential equation (PDE) is applied to the transformed image to iteratively erode the specular component at each pixel. A stopping function is included to terminate the erosion process. After the components are separated, dichromatic editing may be used to independently process the diffuse and specular components. The inventive method utilizes the spatio-temporal information in a video to achieve the separation of the two components.

In an exemplary embodiment, a computational algorithm is provided for decomposing a multi-channel (e.g., RGB) image or video into simpler components. The intensity values at each pixel in the video are decomposed into two distinct dichromatic components—specular and diffuse. Each of these components provides information about the imaged scene that would be otherwise inaccessible. To achieve dichromatic separation, a new class of image filters referred to as "anisotropic multi-scale morphological filters" are used to decompose the image into the diffuse and specular components. These filters are implemented using non-linear partial differential equations (PDEs). This aspect of the present invention relaxes the assumption of the prior art techniques that two pixels in a neighborhood should have the same color for them to interact and reduce specularity.

A PDE can be evolved on the transformed image to dissipate the specular component to produce two images, the diffuse SUV image and the monochromatic specular image. The diffuse RGB image is reconstructed by an inverse transformation of the diffuse SUV image. The evolved PDEs effectively erodes the specular component at each image point. This erosion is guided by local color and shading information, so that diffuse texture is preserved without requiring an explicit segmentation of the image. By developing the problem in terms of morphological PDEs, existing robust numerical algorithms can be used to solve them, which is an important advantage over purely discrete formulations. In addition, videos are naturally considered in the formulation, with the erosion equation for videos including the still-image equations as a special case.

In one embodiment, the present invention utilizes the temporal coherence in videos for the purpose of separation. Instead of treating a video as a collection of 2-dimensional frames, the three dimensional spatial temporal information in videos is used to achieve this separation.

The present invention relies on local color information, and is therefore limited to cases in which the diffuse and specular colors are distinct. It requires the specular color to be known (at least approximately) a priori. These limitations may be overcome by exploiting additional cues, such as local shape, in addition to color.

Another aspect of the invention is dichromatic editing, in which the two dichromatic components, which have very different photometric properties, can be processed separately to achieve different visual effects by adding, subtracting or changing the relative proportion of one component to the other. Dichromatic editing is the process of creating a new multi-channel image sequence by separately filtering the diffuse image sequence and the specular image sequence, then combining the resulting filtered image sequences.

When the source color is uniform in an image or video, the result of separating the diffuse and specular components is a "diffuse image sequence" having multiple color channels and a monochromatic "specular image sequence". An image, whether a still image or single frame of a video, is parameterized in two dimensions corresponding to the spatial domain. For a video, i.e., multiple frames, time is used as a third dimension to index the frames of the video in an image sequence.

BRIEF DESCRIPTION OF THE DRAWINGS

Understanding of the present invention will be facilitated by consideration of the following detailed description of a preferred embodiment of the present invention taken in conjunction with the accompanying drawings.

FIG. 10a is the input image, FIG. 10b is modified to create a wetness effect, FIG. 10c is modified to change the skin color, and FIG. 10d is modified to create the effect of make-up.

FIG. 11a is the input image, FIG. 11b is modified to create a sharpened specular lobe, FIG. 11c is modified to create the effect of an additional light source, and FIG. 11d is modified to create the appearance of a rough surface.

DETAILED DESCRIPTION OF THE PREFERRED EMBODIMENTS

Figure 1:
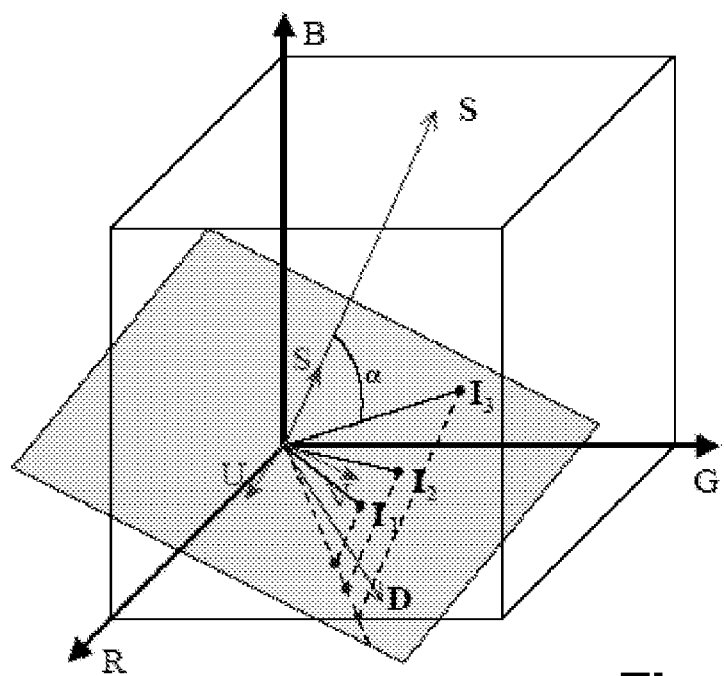
FIG. 1 illustrates a 3D plot of the SUV color space.

The present invention includes a method for the robust decomposition of images and videos that has many advantages over conventional systems. The decomposition provides a mechanism for partially separating reflection components in images and videos. This decomposition dramatically improves many computer vision algorithms, and the present invention includes algorithms for motion estimation, three-dimensional reconstruction, segmentation, and motion estimation that use this decomposition. Another aspect of the invention is the complete separation of reflection components. This is achieved with partial differential equations that refine or filter the partial separation described above. Finally, the present invention includes a process for dichromatic editing in which the separated reflection components are edited separately before being recombined to produce visual effects.

In the following description, an input is considered to be any color images and video consisting of M channels. In the case when M=3, images and video of this type will be referred to as "RGB images" and "RGB video". It will be recognized by those in the art that while the embodiments and examples described herein for the case M=3 address "RGB images" and "RGB videos", the inventive method can be readily adapted to other color formats. Such different color representations or formats include but are not limited to HSI, YUV, YIQ, YCrCb, HSV, CIELAB, CMYK, etc. Furthermore, an image can be converted from any of these formats to RGB prior to applying the methods of the present invention.

One aspect of the present invention is a linear transformation of an M-channel input color space to a lower dimensional space having one channel that contains all of the specular reflection components and the remaining channels containing only diffuse reflection components. The present invention considers images and videos whose M-channel intensity at a point (e.g., pixel) can be written as a linear combination of components, $$I = \sum_{j=1}^{N} \sigma_d^{(j)} D^{(j)} + \sigma_s^{(j)} S^{(j)}, \quad (7)$$

where I, $D^{(j)}$ and $S^{(j)}$ are M-dimensional color vectors. For example, M=3 for an RGB image. Particular interest will be paid to the case of N=1, in which case Equation (7) becomes $$I = \sigma_d D + \sigma_s S. \quad (8)$$

The vector D is referred to as the "diffuse color", and vector S is referred to as the "source color" or "specular color" interchangeably. Also, $\sigma_s$ and $\sigma_d$ are respectively referred to as the "diffuse component" and "specular component" of the image The present invention applies to image formation processes where the image or video color is formed as the sum of terms expressed in Equation (7) and Equation (8). These additive terms can be interpreted as being due to specular and diffuse reflectance as described herein, but other image formation phenomena (e.g., transmission, subsurface scattering) can lead to images having this same property. Synthetic images rendered for instance by a computer graphics program may have this property.

To interpret Equation (7) in terms of diffuse and specular reflection components, let $L(\omega_i, \lambda)$ represent the incident radiance at a surface point, where $\omega_i = (\theta_i, \phi_i) \in \Omega$ parameterizes the hemisphere of incident directions. This incident radiance field can be written (with a slight abuse of notation) in terms of a finite linear basis:

$$L(\omega_i, \lambda) = \sum_{j=1}^{N} L_j(\omega_i) E_j(\lambda). \quad (9)$$

An example with N=2 is an office environment where the illumination can be described as a solid angle of daylight in the direction of the window and a distinct solid angle of fluorescent light in the direction of the ceiling.

Let $f(\theta, \lambda)$ with $\theta = (\theta_i, \phi_i, \theta_o, \phi_o, \lambda)$ denote the BRDF of the surface, and write the image formation equation as $$I_k = \int_\lambda \int_\Omega f(\theta, \lambda) L(\omega_i, \lambda) C_k(\lambda) \cos \theta_i d\omega_i d\lambda \quad (10)$$

According to the dichromatic model, the BRDF of the surface can be decomposed according to $$f(\theta, \lambda) = f_d(\theta) g_d(\theta) + f_s(\theta), \quad (11)$$

where $k_s$ is a constant. This yields the expressions $$\sigma_d^{(j)} = \int_\Omega f_d(\theta) L_j(\omega_i) \cos \theta_i d\omega_i$$

$$\sigma_s^{(j)} = k_s \int_\Omega f_s(\theta) L_j(\omega_i) \cos \theta_i d\omega_i$$

$$D_k^{(j)} = \int g_d(\lambda) E_j(\lambda) C_k(\lambda) d\lambda$$

$$S_k^{(j)} = \int E_j(\lambda) C_k(\lambda) d\lambda,$$

where $S_k^{(j)}$ and $D_k^{(j)}$ are the $k^{th}$ components of the color vectors $D^{(j)}$ and $S^{(j)}$ in Equation 7. The case N=1 in Equation 9 corresponds to a scene with illumination having a single spectral power distribution, and this leads to the expression in Equation 8.

In the present invention, a partial separation of the diffuse and specular components is computed by projecting an M-dimensional color vector I at an image point onto the (M−N)-dimensional subspace orthogonal to the source colors $S^{(j)}$. Letting $\{r_l\}_{l=1\ldots(M-N)}$ represent an orthonormal basis for this orthogonal subspace, the $l^{th}$ component (or 'channel') of the projection will satisfy $$J_l = \sum_{j=1}^{N} \sigma_d^{(j)} r_l^T D^{(j)}. \quad (12)$$

The terms $J_l$ are independent of the specular reflection components $\sigma_s^{(j)}$ and are therefore specular invariant. The subspace orthogonal to the source colors is a "specular invariant subspace", and an image created by projecting each pixel onto this subspace is a "specular invariant image". A specular invariant image with (M−N) channels defined by this process is treated as an image with (M−N) 'colors', but these 'colors' can assume negative values. In the present invention, a monochromatic specular invariant is given by $$J_{inv(M-N)} = \left( \sum_{l=1}^{M-N} I_l^2 \right)^{1/2}, \quad (13)$$

where the subscript $J_{inv(u)}$ is used to indicate that the monochromatic invariant is derived from a u-dimensional specular invariant subspace.

Figure 6:
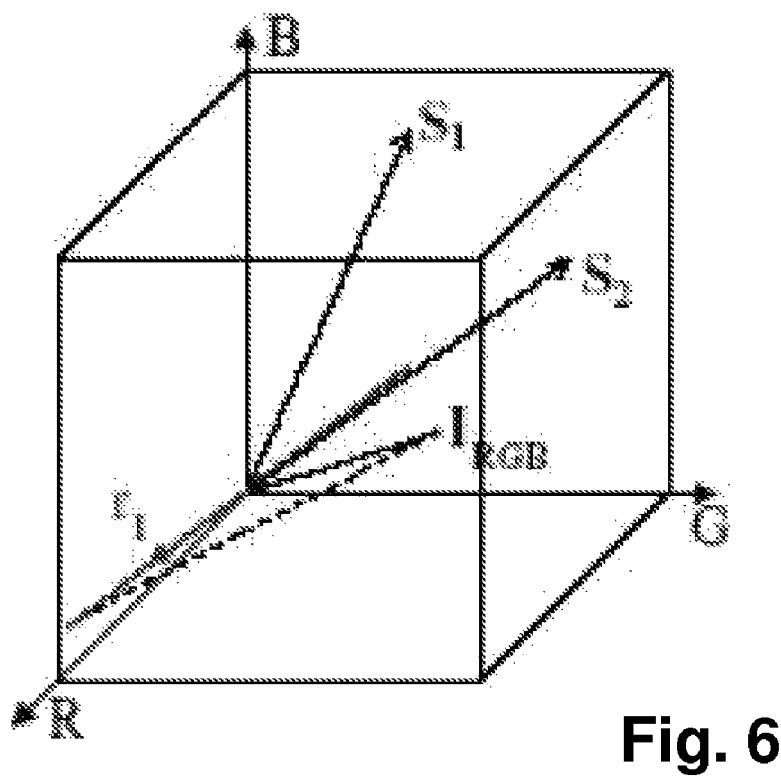
FIG. 6 is a 3D plot showing the projection of RGB color vectors for two source colors onto a one-dimensional specular invariant subspace.
Figure 7:
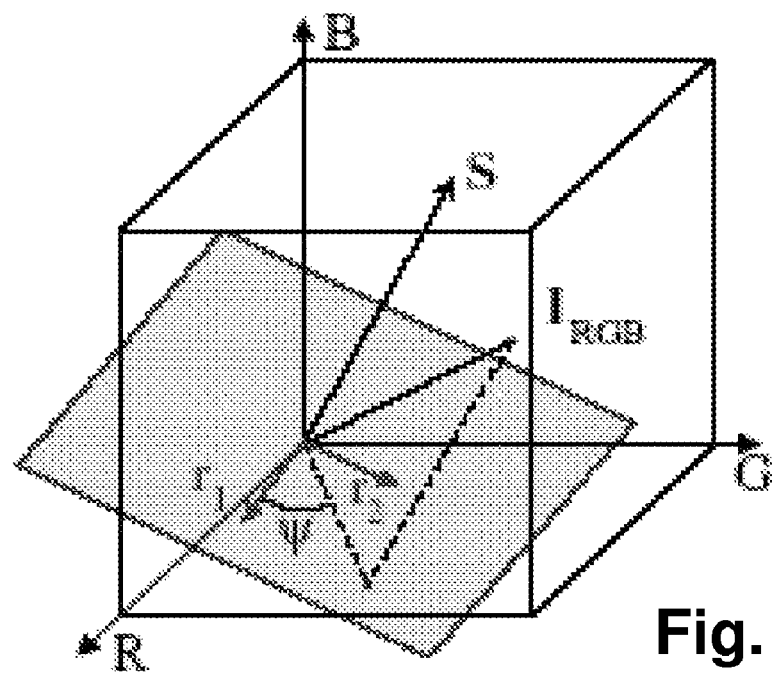
FIG. 7 is a 3D plot showing the projection of RGB color vector $I_{RGB}$ onto the 2D subspace orthogonal to the source color S.

Examples are shown in FIGS. 6 and 7. FIG. 6 shows the case of M=3 (RGB) and with two source colors (N=2). In this case, the specular invariant subspace is one-dimensional, and a specular invariant image is computed by projecting RGB color vectors onto this line in color space. FIG. 7 shows the existence of a two-dimensional specular invariant subspace in the case (M=3, N=1).

An essential feature of the specular invariants of Equations 12 and 13 is that they preserve diffuse reflection effects encoded in the geometric scale factors $\sigma_d^{(j)}$. For many surfaces, the diffuse component is well approximated by the Lambertian model, meaning that the term $f_d(\theta)$ in Equation 11 is a constant function of and the geometric scale factors $\sigma_d^{(j)}$ do not change with viewpoint. This implies that the specular invariant images defined by Equations 12 and 13: 1) satisfy the 'constant-brightness assumption' underlying most stereo and structure-from-motion systems; and 2) provide access to surface normal information through Lambertian-based photometric reconstruction methods such as shape-from-shading. As a result, by computing these invariants as a pre-processing step, the domain of applicability of many Lambertian-based computer vision algorithms can be expanded to include a much broader class of specular, non-Lambertian surfaces.

RGB images with a single illuminant color (M=3, N=1) occur frequently and special notation is used to describe the linear transformation of Equation 12 in this case. In the present invention, the SUV color space is a data-dependent color space that is obtained by rotating the RGB space such that the direction of the light source color S is rotated to be aligned with one of the color axes in the transformed space. (See FIG. 1). This SUV space is a data-dependent color space because it depends on the source color S. The SUV color space transformation is:

$$I_{SUV} = RI_{RGB}, \quad (14)$$

where R is any rotation of $\mathbb{R}^3$ satisfying $RS = [1, 0, 0]^T$. The first row of R is $S^T$, and the second and third rows of R span the nullspace of S.

Similar to Park's transformation (Equation 6), one of the transformed axes in SUV space is aligned with the illuminant (source) color. Unlike Park's transformation, however, this channel includes the complete specular component, leaving the remaining two channels to be purely diffuse. Since they lie in the specular invariant subspace and are independent of the specular geometric scale factor $\sigma_s$, these components constitute a specular invariant.

The SUV space has two important properties;

First, it separates the diffuse and specular reflection effects. The first channel (the S channel) encodes the entire specular component and an unknown fraction of the diffuse component, while the remaining two channels (U and V) are independent of $\sigma_s$ and are functions of only the diffuse reflectance. Letting $r_i^T$ denote the $i^{th}$ row of R, and assuming point source illumination from direction $\hat{l}$ at a point with surface normal $\hat{n}$, the two diffuse UV channels are $$I_U = r_2^T D f_d(\theta) \hat{n} \cdot \hat{l}, \text{ and} \quad (15)$$

$$I_V = r_3^T D f_d(\theta) \hat{n} \cdot \hat{l}, \quad (16)$$

which depend only on diffuse-shading and are specular-free. The S-channel is given by Equation 17.

$$I_S = r_1^T D f_d(\theta) \hat{n} \cdot \hat{l} + f_s(\theta) \hat{n} \cdot \hat{l} \quad (17)$$

$$= I_{S_d} + f_s(\theta) \hat{n} \cdot \hat{l},$$

where the notation $I_{S_d}$ is used to denote the diffuse contribution to the S channel. Assuming Lambertian diffuse reflectance, $f_d(\theta)$ is a constant function of $\theta$, and the coefficients $\rho_S = r_1^T D f_d$, $\rho_U = r_2^T D f_d$, and $\rho_V = r_3^T D f_d$ behave as Lambertian albedos. $I_{S_d}$ is the diffuse component of the S-channel.

Second, the image of scene points with the same diffuse albedo (D) have colors that lie on a line in the UV plane that passes through the origin. The equation of this line is $$r_3^T D I_U - r_2^T D I_V = 0. \quad (18)$$

Unlike prior art Equation 4, the SUV is a linear transformation that yields two "diffuse" channels, and unlike Equation 6, these two "diffuse" channels (U and V) are in fact completely free of specularity, i.e., independent of $f_s(\theta)$ and are functions of only the diffuse reflectance.

FIG. 1 is a plot illustrating the SUV color space relative to the RGB space. Three observations of the same material yield color vectors $I_1$, $I_2$, and $I_3$ in the dichromatic plane (shown shaded) spanned by the source and diffuse colors S and D. The SUV color space corresponds to a rotation of the RGB space, as indicated by the x, y, z axes in the plot corresponding to G, R and B, respectively. One axis is aligned with the source color, and two of three transformed channels (U and V) are independent of specular reflectance so that diffuse shading information is preserved.

Figure 2:
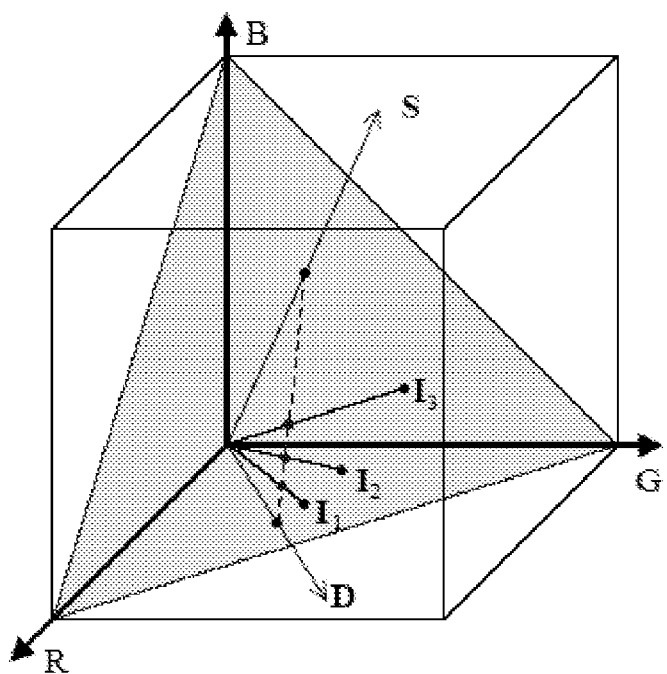
FIG. 2 illustrates a 3D plot of conventional color spaces (e.g., HSV, HSI, r-g chromaticity) that use central projection.

FIG. 2 is a plot that compares SUV color space to conventional color spaces that use central projection. The central projection shown in this plot is used to compute conventional r-g chromaticity values and HSV-type color space. Unlike SUV space, these conventional color spaces do not preserve shading information.

In order to compute the two-channel diffuse image, it is necessary to know the effective source color S. Under controlled conditions, the source color can be calibrated. In an uncontrolled setting, the source color can be estimated using a number of techniques that are known in the art.

As examples, Lee (*J. Optical Society of America A*, 3(10): 1694-1699 (October 1986)) finds the source color by intersecting lines in 2D chromaticity space. Finlayson and Schaefer (*Proc. European Conf. on Computer Vision*, vol. 1, pp. 342-358 (2001)) use the fact that the chromaticity of the majority of illuminants lie along a known curve in chromaticity space and recover the source color from an image of a single homogeneous dichromatic surface.

Specular invariants computed by projection onto specular invariant subspaces of color space contain only diffuse reflection components, and in the present invention, these invariants are used for a variety of computer vision tasks.

The present invention includes a method for three-dimensional reconstruction by a photometric stereo method using specular invariant images. While the following description considers the RGB case (M=3) with a single illuminant (N=1), it will be recognized by those in the art that the inventive methods can readily be adapted to arbitrary cases N and M provided that N<M.

Let $J^1$, $J^2$, and $J^3$ be three 2-channel color vectors produced by observing a single point under three different light source directions $l^1$, $l^2$, and $l^3$ and projecting the resulting RGB color vectors onto the two-dimensional specular invariant subspace that is orthogonal to the known illuminant color S. From Equations 15 and 16, it follows that $$J^k = [I_U^k, I_V^k]^T = (\hat{n} \cdot \hat{l}^k)\rho, \quad (19)$$

where $\rho$ is a two-channel UV albedo. A shading vector is defined according to $F = [f^1, f^2, f^3]^T = [l^1 l^2 l^3]^T \hat{n}$, and the shading information from all three observations is combined in an intensity matrix that satisfies $$[J] = \begin{bmatrix} J_1^1 & J_2^1 \\ J_1^2 & J_2^2 \\ J_1^3 & J_2^3 \end{bmatrix} = \begin{bmatrix} f^1 \rho u & f^1 \rho v \\ f^2 \rho u & f^2 \rho v \\ f^3 \rho u & f^3 \rho v \end{bmatrix} = F\rho^T.$$

The least squares estimate of the shading vector F can easily be computed from the intensity matrix; it is the principal eigenvector of $[J][J]^T$. Once the shading vector is known, the surface normal is found by solving the matrix equation $$F = [l^1 l^2 l^3]^T \hat{n}.$$

Figure 4:
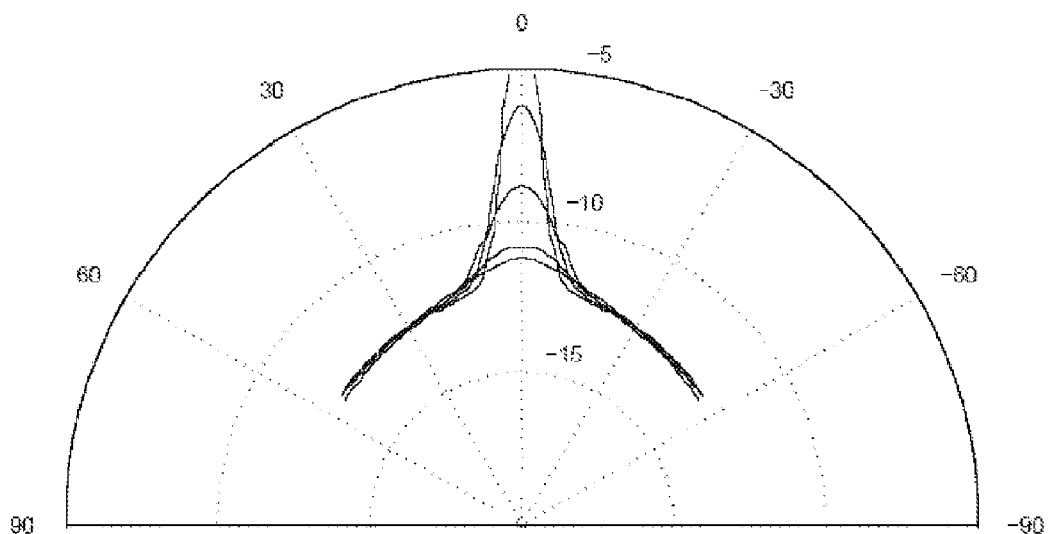
FIG. 4 is a plot of relative BRDFs as a function of half-angle.

To validate the specular-invariant photometric stereo method quantitatively, objects of known shape and varying material properties were used, and the shape was estimated using the inventive method. The objects consisted of a set of spheres with increasing specular gloss. The incident-plane BRDFs of these spheres are shown in FIG. 4.

For each sphere, a set of four high dynamic range (HDR) images were captured from a fixed viewpoint and four known illumination directions. The source color was first calibrated by imaging a Macbeth ColorChecker® chart, then it was used to compute the specular invariant images and recover the surface shape as described above.

As a means for comparison, two different RGB-based photometric stereo techniques were also applied to the same data. The first method uses all four RGB images and assumes Lambertian reflectance. The second method assumes Lambertian+specular reflectance and reconstructs the surface by choosing the three least specular RGB measurements at each pixel.

Figure 5:
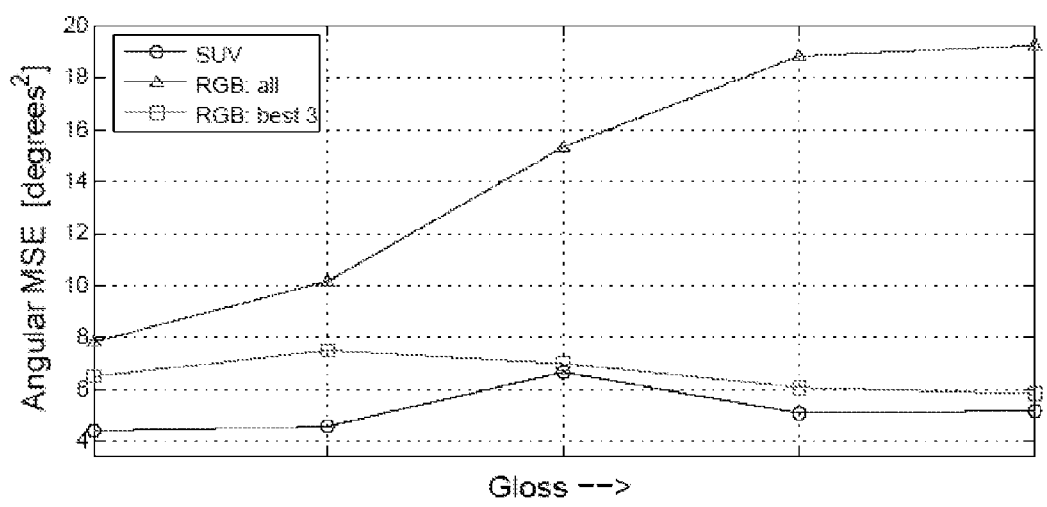
FIG. 5 is a plot of the mean-square angular error.

The results are shown in FIG. 5, which displays the angular difference between the true and estimated surface normals as a function of increasing specularity. This plot shows the mean square error computed over a window encompassing the visible specularities in the four images. The results demonstrate that the specular-invariant-based reconstruction is largely independent of the specular reflectance, while the four- and three-image RGB methods are affected by it. The four-image method assumes Lambertian reflectance and its performance degrades monotonically as gloss increases. While the three-image RGB method performs well for the high gloss (narrow specular lobe) spheres, it performs less well when the angular support of the specular lobe is large relative to the separation of the light source directions.

In addition to the photometric stereo method described above, in the present invention, specular invariants may be used for recovering dense optical flow. The following description considers the RGB case (M=3) with two source colors (N=2), it will be recognized by those in the art that the inventive methods can readily be adapted to arbitrary cases N and M provided that N<M.

Recovering dense optical flow relies on the 'constant-brightness assumption', which is violated when an observer moves relative to a static, specular scene. Optical flow in the presence of specular reflections in a complex illumination environment can be improved by computing a specular invariant as a pre-processing step. For evaluation, an RGB image sequence was captured by a camera translating horizontally relative to a static scene under two-color illumination. The sequence was used to compute a conventional grayscale sequence $I_g(t)$, a single-color invariant sequence $J_{inv(2)}(t)$ and a two-color invariant sequence $J_{inv(1)}(t)$. These three videos were used as input to Black and Anandan's algorithm for robust optical flow (*Proc. IEEE Int. Conf. Computer Vision*, pages 231-236 (1993)). Since the camera undergoes pure translation, the 'ground-truth' flow was known to lie along parallel horizontal lines. The flow recovered using the conventional grayscale and single-color invariant sequences were severely corrupted by specular highlights. In contrast, the flow computed from the mixed-illuminant specular invariant was close to the ground truth and was largely unaffected by these non-Lambertian effects.

The present invention includes a process for dense binocular stereo. The vast majority of stereo algorithms are based (either explicitly or implicitly) on the assumption that surfaces are Lambertian. Since specular reflections violate this assumption, stereo reconstructions of specular surfaces are often inaccurate. In cases of significant specular reflections and complex illumination conditions, the accuracy of existing stereo algorithms can be improved by computing the inventive specular invariant as a pre-process.

Similarly, the invention is useful for Helmholtz stereopsis, a method for reconstructing the geometry of objects from a collection of images. (See, Zickler, et al., *Proc. European Conf. on Computer Vision*, pp. III:869-884 (2002), which is incorporated herein by reference.) Unlike existing methods for surface reconstruction (e.g., stereo vision, structure from motion, photometric stereopsis), Helmholtz stereopsis makes no assumptions about the nature of the bidirectional reflectance distribution functions (BRDFs) of objects. Multinocular stereopsis exploits Helmholtz reciprocity by choosing pairs of light source and camera positions that guarantee that the ratio of the emitted radiance to the incident irradiance is the same for corresponding points in the two images. The method provides direct estimates of both depth and surface normals, and consequently weds the advantages of both conventional stereopsis and photometric stereopsis.

The present invention includes a process for shape from shading based on the inventive specular invariant. We consider the case when M=3 (RGB) and N=1 for illustrative purposes, but it is clear that the method can easily be adapted to arbitrary M and N provided N<M. Given a single point light-source in direction/the specular invariant image of Equation 13 reduces to $$J_{inv(2)}=f_d((r_1^T D)^2+(r_1^T D)^2)^{1/2}\hat{n}\cdot \hat{l}, \quad (20)$$

which is the image formation equation for a Lambertian surface with an effective albedo given by the first two terms. Shape from shading is accomplished by using this specular invariant image as input.

Figure 8:
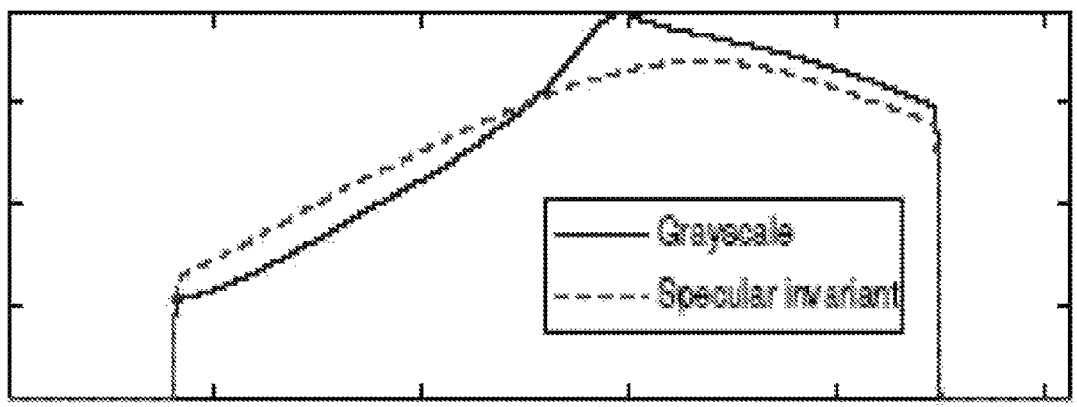
FIG. 8 is a plot comparing shapes recovered using a shape-from-shading technique with both a grayscale image and the specular invariant according to the present invention.

The benefit of this approach is demonstrated in FIG. 8, where the performance of Zheng and Chellappa's shape from shading algorithm (*IEEE Trans. Pattern Analysis and Machine Intelligence*, 13(7):680-702 (1991)) is compared for both a conventional grayscale image $I_g$ and a single-color invariant image $J_{inv(2)}$. Grayscale and specular invariant images are computed from an RGB image of a pear. The surface profile is then measured along a line crossing the image, using relative shading to indicate shape. Since the shape is a pear, it should be generally smooth and rounded. The solid profile in the graph shows that specular reflections cause severe artifacts such as corners and edges when the algorithm is applied to the grayscale image. In contrast, as shown by the dashed profile, one can obtain vastly improved results using the same algorithm by computing the specular invariant as a pre-processing step.

More generally, the inventive specular invariants can be used to improve the performance of a broad class of Lambertian-based reconstruction systems in the presence of specular, non-Lambertian surfaces. This includes, for example, methods that combine both geometric and photometric constraints to obtain accurate surface shape. The passive photometric stereo algorithm described by Lim et al. (*Proc. IEEE Int. Conf. Computer Vision*, 2005.) can be used as an example. This method begins with an approximate, piece-wise planar reconstruction obtained by tracking a small number of features across a video sequence under (possibly varying) directional illumination. Then, an iterative method based on uncalibrated Lambertian photometric stereo simultaneously refines the reconstruction and estimates the unknown illumination directions.

Figure 9:
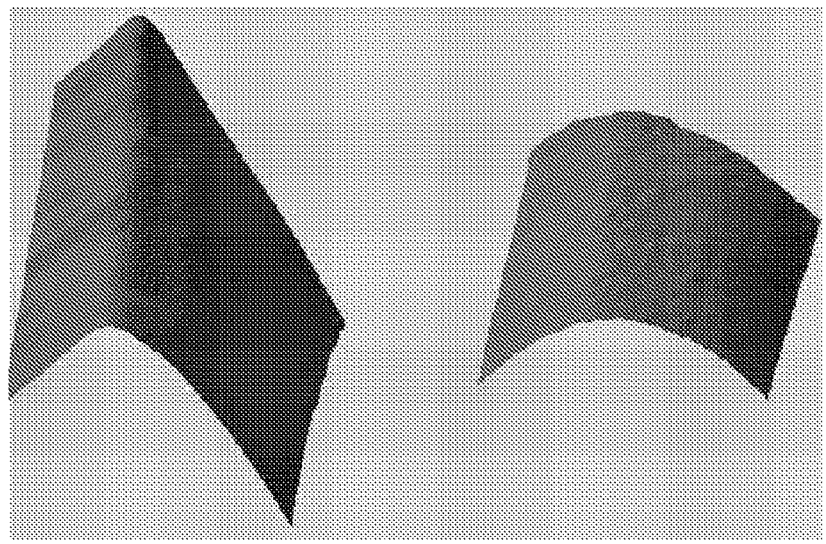
FIG. 9 is a comparison of shapes from tracking and photometric reconstruction of a specular cylinder using grayscale and specular invariant sequences.

An example of tracking uses an image sequence that consists of a moderately specular cylinder moving under fixed illumination and viewpoint. The shape is estimated by applying the same algorithm to both the conventional grayscale sequence ($I_g(t)$) and the specular invariant sequence ($J_{inv(2)}$) computed from the same RGB data. The reconstruction obtained using the specular invariant is smooth and nearly cylindrical (right side of FIG. 9), while that computed from the conventional grayscale sequence is severely corrupted by specular reflections, which are manifested as edges and abrupt changes in the 3-D surface, as illustrated by the image on the left side of FIG. 9.

The utility of the proposed invariants relies on the angular separation between the diffuse and source colors ($D^{(j)}$ and $S^{(j)}$) in color space. When this separation is small, the signal-to-noise ratio (SNR) in the subspace image can be prohibitively low. In practice, this can be improved using high dynamic range images. Additionally, surface points with low SNR can be detected by monitoring the angle between the source colors $S^{(j)}$ and the input color vectors $I_{RGB}$, and this information can be incorporated into any robust vision algorithm.

The present invention includes a second class of invariants that is different from the specular invariants described above. These are invariant to diffuse geometric factors ($\sigma_d^{(j)}$) in addition to specular reflections. An exemplary embodiment is the case of a single source color (N=1) when M=3, where a second invariant is derived by taking the ratio between specular invariant channels in Equation 12. The result, $$J_1/J_2=r_1^T D/r_2^T D, \quad (21)$$

is independent of both the diffuse and specular geometric scale factors $\sigma_d$ and $\sigma_s$. As shown in FIG. 7, it is instructive to interpret this ratio as an angle and define $$\psi = \tan^{-1}(J_1/J_2) = \tan^{-1}(r_1^T D/r_2^T D). \quad (22)$$

which is referred to as the generalized hue, since it reduces to the standard definition of hue when the source color S is white. Generalized hue is invariant to both specularities and diffuse shading, and is discriminative only with respect to the spectral reflectance of the surface.

The isolation of spectral reflectance is generalized to mixed illumination (N>1) and hyper-spectral images (M>3), by considering either multiple images, spatial coherence, or both. As an illustration, consider an illumination environment with two different source colors (N=2), and suppose two RGB images with altered illumination directions are acquired. (The SPDs of the sources remain the same.) In this case, the specular invariant subspace is one-dimensional, and the specular invariant images J and $\bar{J}$ of a surface point under the two lighting configurations are given by $$J = \sigma_d^{(1)} r^T D^{(1)} + \sigma_d^{(2)} r^T D^{(2)}$$

$$\bar{J} = \bar{\sigma}_d^{(1)} r^T D^{(1)} + \bar{\sigma}_d^{(2)} r^T D^{(2)}.$$

Here, the subscript corresponding to the invariant channel index has been suppressed since there is only a single channel.

Suppose that there are two additional image points ($p_2$ and $p_3$) that correspond to surface points having the same geometric configurations (e.g., the same surface normal under distant lighting) but distinct spectral reflectance. This yields a total of six specular invariant observations—three points under two illuminations—that can be assembled into a 3×2 observation matrix. As shown by Narasimhan et al. (*Proc. IEEE Int. Conf. Computer Vision*, volume 2, pages 1387-1394 (2003)), such a matrix can be factored as $$\begin{bmatrix} J_{p1} & \bar{J}_{p1} \\ J_{p2} & \bar{J}_{p2} \\ J_{p3} & \bar{J}_{p3} \end{bmatrix} = \begin{bmatrix} r^T D_{p1}^{(1)} & r^T D_{p1}^{(2)} \\ r^T D_{p2}^{(1)} & r^T D_{p2}^{(2)} \\ r^T D_{p3}^{(1)} & r^T D_{p3}^{(2)} \end{bmatrix} \begin{bmatrix} \sigma_d^{(1)} & \bar{\sigma}_d^{(1)} \\ \sigma_d^{(2)} & \bar{\sigma}_d^{(2)} \end{bmatrix},$$

from which it follows that the ratio of determinants of its two 2×2 sub-matrices satisfies $$\frac{J_{p1}\bar{J}_{p2} - \bar{J}_{p1}J_{p2}}{J_{p2}\bar{J}_{p3} - \bar{J}_{p2}J_{p3}} = \frac{D_{p1}^{(1)T} D_{p2}^{(2)} - D_{p1}^{(2)T} D_{p2}^{(1)}}{D_{p2}^{(1)T} D_{p3}^{(2)} - D_{p3}^{(2)T} D_{p2}^{(1)}}, \quad (23)$$

which depends only on the spectral reflectance of the surface points and is invariant to the geometric scale factors.

While this example relies on the identification of three surface points ($p_1, p_2, p_3$), a similar invariant can be computed using a single surface point and multiple specular invariant channels collected from a hyper-spectral image. Determinant-based invariants of this form have been applied directly to RGB images to obtain invariants for relatively general reflectance functions under monochromatic environments. The present method can be viewed simultaneously as an extension of such an approach to mixed-illumination environments as well as a specialization to the dichromatic model. The latter is an important difference, because it enables the distinction between specular and diffuse material properties in the resulting invariants.

The present invention includes a process for segmentation based on the inventive generalized hue. Since it is invariant to both specular reflections and diffuse shading information, material-based segmentation is achieved by computing a generalized hue image from an RGB image prior to segmentation. The same is not true for the conventional hue image unless the illuminant is white.

The linear transformation described in Equation 14 is a partial separation of the diffuse and specular components since it creates two diffuse channels and one channel that contains all of the specular reflection component in addition to an unknown quantity of the diffuse component. The present invention includes a method for completing this partial separation and thereby recovering a complete separation of the diffuse and specular components in an RGB image.

The observed color I is a linear combination of the diffuse color $I_d$ and the specular component, which lies along the S-axis. In order to completely separate the diffuse and specular components in an image I(x,y) or video I(x,y,t), the diffuse and specular contributions to the S-channel value are identified and separated.

Figure 3:
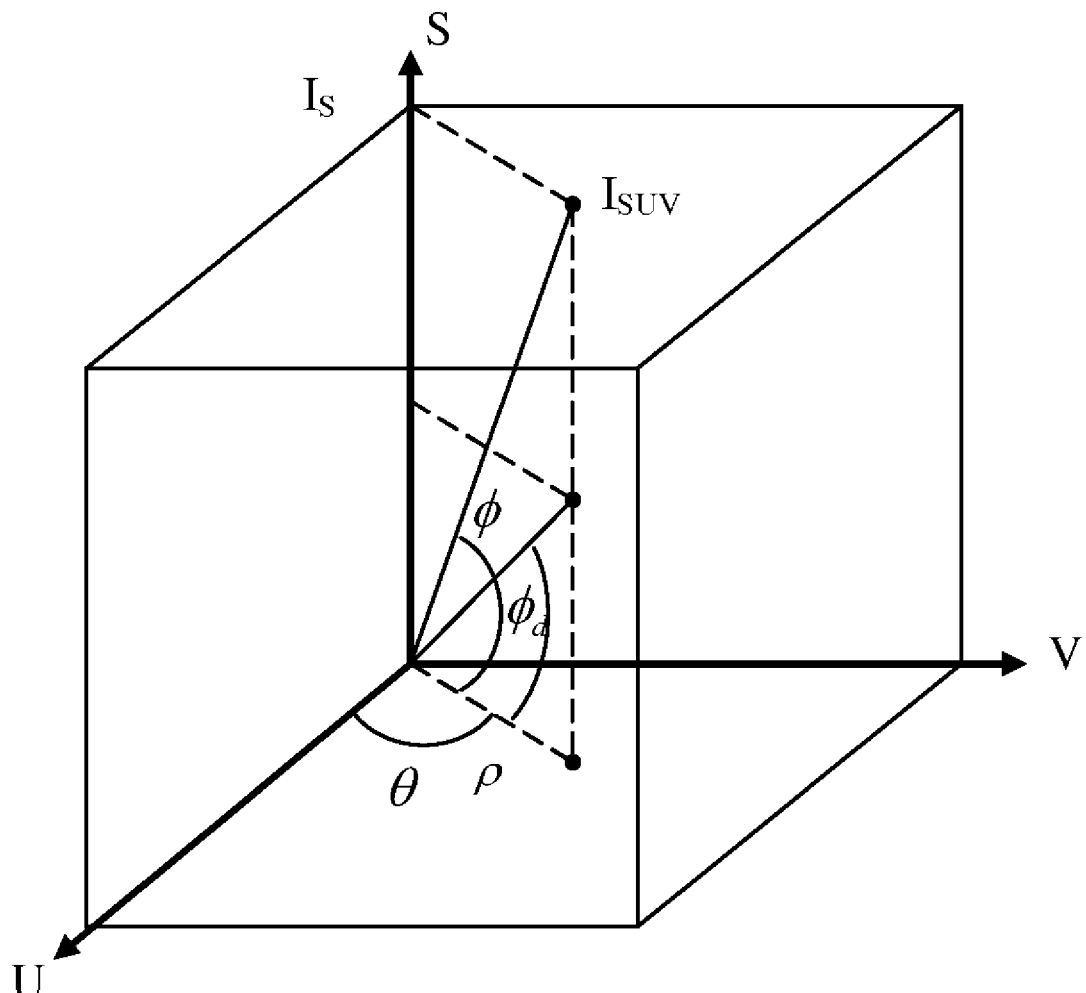
FIG. 3 illustrates a 3D plot of a pixel in SUV space.

FIG. 3 illustrates a pixel in SUV space. For any image mapped to its SUV space, points in the UV plane are purely diffuse, and the specular component lies entirely along the S-axis. A portion of the S-value is also due to the diffuse component. Thus, the problem of separating the two components can be framed as the problem of estimating the unknown component $S_d$, which is the S-value due to the diffuse component.

The SUV color space is re-parameterized using a combination of cylindrical and spherical coordinates. FIG. 3 is a 3D plot in which a color in the SUV color space is parameterized by $(\rho, \theta, \phi)$. The parameters are defined in below:

$$\rho = \sqrt{I_U^2 + I_V^2}, \quad (24)$$

$$\theta = \tan^{-1}\left(\frac{I_U}{I_V}\right), \text{ and}$$

$$\phi = \tan^{-1}\left(\frac{I_S}{\rho}\right).$$

This parameterization has the following properties. First, since they depend only on the diffuse UV channels, both $\rho$ and $\theta$ are independent of the specular reflectance component. Second, since the illuminant color is aligned with the S-axis, the angle $\theta$ is the generalized hue. Third, $\rho$ represents diffuse shading, since it is directly related to $\hat{n} \cdot l$, and therefore, the magnitude of the diffuse component. And fourth, $\phi$ is a linear combination of specular and diffuse components, and can be written $\phi = \phi_s + \phi_d$, where $\phi_s$ and $\phi_d$ are the specular and diffuse contributions by $\phi$.

According to these properties, the problem of computing a specular/diffuse separation is reduced to one of estimating $\phi_d(x,y)$, the diffuse contribution to $\phi$ at each image point. Once the scalar function $\phi_d(x,y)$ is known, the RGB diffuse component follow directly from inverting the transformations in Equation 8 and Equations 24, with $\phi$ replaced by $\phi_d$.

The following two observations can be made: first, the contribution due to specularity in the S channel is always positive, so $I_{S_d} \leq I_S$ (and $0 \leq \phi \leq \pi/2$.) Second, if the diffuse color of two pixels is the same, they lie on the same ray from the origin in the UV plane and therefore have the same angle $\theta$.

Motivated by the second observation, the following assumption is made: if two neighboring points (points close to one another in the image plane) lie on the same ray from the origin, they are likely to have the same diffuse color. In terms of angles, this means that neighboring points with similar values of θ will have similar values for φ. This assumption forms the basis of a family of PDEs. These PDEs define a series of local interactions in which color information is shared along curves (or surfaces) of constant generalized hue.

In the present invention a family of non-linear PDEs are evolved to create an anisotropic multi-scale erosion that is used to compute the specular/diffuse separation through the estimation of the scalar function $\phi_d(x,y)$ through purely local interactions. The evolving of a PDE acts as a morphological filter that iteratively "erodes" the specular contribution to $\phi$ and converges to an estimate of $\phi_d$ at each point. The erosion process is guided locally by the diffuse color information provided by ρ and θ, and is formulated in the continuous domain using one of a family of PDEs that define multi-scale erosion.

Let $V(x,y)$ represent the direction of minimum variation in θ at point $(x,y)$. The objective is to minimize the gradient of $\phi(x,y)$ along this direction under the constraint that $\phi$ does not increase. This goal is closely related to multi-scale erosion. The multi-scale erosion $\epsilon(x,t)$ of a bivariate function $f: R^2 \to R$ by structuring set $B \subseteq R^2$ at scale t is defined as $$\varepsilon(x, t) = (f \theta tB)(x) \stackrel{\Delta}{=} \inf\{f(x + \Delta x) : \Delta x \in tB\}, \quad (25)$$

where the eroding set B is compact, and $$tB \stackrel{\Delta}{=} \{tb : b \in B\}.$$

The erosion $\epsilon(x,t)$ evaluated at a particular value of t corresponds to an erosion of the function $f(x)$, where the function value at $x=(x,y)$ is replaced by the minimum of all functions values in the "neighborhood" tB, which is a scaled replica of structuring set B. A multi-scale erosion is computed by considering the PDE:

$$\frac{\partial \varepsilon}{\partial t}(x, t) = \lim_{\Delta t \to 0} \frac{\varepsilon(x, t + \Delta t) - \varepsilon(x, t)}{\Delta t}. \quad (26)$$

When the structuring set is both compact and convex, the multi-scale erosion has a semigroup structure, allowing one to write $$\frac{\partial \varepsilon}{\partial t}(x, t) = \lim_{\Delta t \to 0} \frac{\inf\{\nabla \varepsilon^T \Delta x : \Delta x \in \Delta tB\}}{\Delta t} \quad (27)$$

where $\nabla \epsilon$ is the two-dimensional spatial gradient of $\epsilon$ evaluated at t. Finally, in the special case where B is disk-shaped and the erosion is isotropic, Equation 27 becomes $$\epsilon_t = -\|\nabla \epsilon\|. \quad (28)$$

Equation 28 is an example of a PDE that can be used for specular/diffuse separation in the case where the scene consists of a texture-less surface with uniform diffuse color. To illustrate, suppose one is given an input image with corresponding functions $\rho(x)$, $\theta(x)$, and $\phi(x)$, and defines $\epsilon(x,0)=\phi(x)$. The solution to Equation 27 evaluated at scale t corresponds to the erosion of $\phi$ by a disk-shaped structuring set, meaning that the value of $\phi$ at each image point is replaced by the minimum value within a disk-shaped neighborhood of radius t. Since $\phi_d(x) \leq \phi(x)$, it follows that when the image contains at least one image point that is purely diffuse (that is, for which $\phi_s=0$ then $\epsilon(x,t)$ evaluated at t will converge to $\phi_d(x)$ as t is made sufficiently large.

In the exemplary embodiments of the present invention, three sophisticated PDEs are developed for cases of multiple regions of uniform diffuse color, complex diffuse texture, and video. In each of these, the value of $\phi_d$ at each image point is estimated by eroding the initial function $\phi$. By changing the structuring set, the process can be controlled so that region boundaries and diffuse texture are preserved during the process. In particular, the PDE governing the evolution of $\phi$ for the three different cases, the texture-less images, textured images, and video, can all be written as $$\epsilon_t = -g(\rho, \nabla \rho)(\nabla \epsilon^T M \nabla \epsilon)^{1/2}, \quad (29)$$

where M will be a different matrix for each case. $g(\rho, \nabla \rho)$ is called the "stopping function" and is defined below.

Table 1 provides a summary of the conditions for five different cases:

TABLE 1

|  | Textureless | Texture 1 | Texture 2 | Video 1 | Video 2 |
| --- | --- | --- | --- | --- | --- |
| Structuring Set | 2D disk | 2D line | 2D ellipse | 3D disk | 3D line |
| Direction | Isotropic | Iso-cont. of θ | Iso-cont. of θ | Iso-surf. of θ | Optic flow |
| M | $I_{2 \times 2}$ | $I_{2 \times 2} - \hat{V\theta}\hat{V\theta}^T$ | $AA^T$ | $I_{3 \times 3} - \hat{V\theta}\hat{V\theta}^T$ | $FF^T/\|F\|^2$ |

Equation 28 describes a process in which the specular component of $\phi$ is eroded equally in all directions. Such isotropic erosion is desirable in cases of homogeneous diffuse color, i.e., texture-less surfaces, but if regions of distinct color exist, there is a possibility that "color bleeding" may occur. To prevent this, a "stopping function" analogous to that used in anisotropic diffusion is introduced. A stopping function is useful for attenuating the erosion process in two different cases. First, if a region of surfaces is "white" (i.e., it reflects all wavelengths equally) or if the surface is the same color as the light source, the diffuse component of color cannot be isolated. Since ρ=0 in this case, no diffuse color information is available, and erosion should be arrested. Second, information about $\phi$ should not be shared across boundaries between regions of distinct color, but only between neighboring image points for which $\phi_d$ is likely to be equal. Since these boundaries often coincide with larger values of $\|\nabla \rho\|$, erosion should be attenuated when $\|\nabla\rho\|$ is large. One possible stopping function that meets these guidelines is given as $$g(\rho, \nabla\rho) = \left(\frac{1-e^{-\rho}}{1+e^{-\rho}}\right)\frac{e^{-(\|\nabla\rho\|-\tau)}}{1+e^{-(\|\nabla\rho\|-\tau)}} \tag{30}$$

where $\tau$ is a threshold on $\|\nabla\rho\|$, above which erosion is heavily attenuated. Incorporating this into Equation 28 yields:

$$\epsilon_t = -g(\rho,\nabla\rho)\|\nabla\epsilon\| = -g(\rho,\nabla\rho)(\nabla\epsilon^T I_{2\times 2}\nabla\epsilon)^{1/2}. \tag{31}$$

The erosion process defined by this equation can be used for the specular/diffuse separation of images containing large regions of uniform diffuse color.

There is no information about the diffuse color a priori, so it is impossible to know the correct neighborhood (if it even exists) with certainty. Since $\phi$ is independent of both specularity and shading information, the directions tangent to the iso-contours of $\theta(x)$ provide a good choice. In the absence of any additional information, they provide a good local predictor for the direction V in which $\phi_d$ is constant. To start, define:

$$\nabla\hat{\theta} = \begin{cases} \nabla\theta/\|\nabla\theta\| & \text{for } \|\nabla\theta\| > 0 \\ 0 & \text{for } \|\nabla\theta\| = 0, \end{cases} \tag{32}$$

where $\nabla(\bullet)$ refers to the spatial gradient, and the direction orthogonal to $\nabla\theta$ is denoted by V. Since $\theta$ is periodic, a definition of distance is necessary for its gradient to be correctly computed. The distance between two angles $\theta_1$ and $\theta_2$ is defined as $\min(|\theta_1-\theta_2|, 2\pi-|\theta_1-\theta_2|)$. The multi-scale erosion of $\phi$ with the spatially-varying, linear structuring sets V(x) is derived analogous to the isotropic (disk-shaped) case discussed previously.

$$\epsilon_t = \lim_{\Delta t \to 0} \frac{\inf\{\nabla\epsilon^T \Delta x: \Delta x \in \Delta t V\}}{\Delta t} = \lim_{\Delta t \to 0} \frac{-\Delta t |\nabla\epsilon^T V|}{\Delta t} = -|\nabla\epsilon^T V|. \tag{33}$$

Using the fact that $V=[\hat{\theta}_y, -\hat{\theta}_x]^T$ (or $[\hat{\theta}_y, -\hat{\theta}_x]^T$), and including the stopping function, produces:

$$\epsilon_t = -g(\rho,\nabla\rho)[\nabla\epsilon^T(I_{2\times 2} - \nabla\hat{\theta}\nabla\hat{\theta}^T)\nabla\epsilon]^{1/2} \tag{34}$$

Using similar arguments to those in the isotropic case, it can be shown that $\epsilon(x,t)$ evaluated at sufficiently large t will be equal to $\phi_d(x)$ (and will yield a correct specular/diffuse separation if the iso-contour of $\theta$ passing through each point x: 1) contains only points for which $\phi_d$ is constant; and 2) contains at least one point at which a purely diffuse observation $\phi_s=0$ is available. Note that in regions where the diffuse color is constant (i.e. $\nabla\hat{\theta}=[0\ 0]^T$), this equation reduces to Equation 31, and the erosion becomes isotropic as desired.

In practice, the transition from linear to disk-shaped structuring sets in Equation 34 is controlled by a threshold on $\|\nabla\theta\|$. This discontinuous transition can be avoided by employing an elliptical structuring set with a minor axis aligned with the direction of $\nabla\theta$ and with an eccentricity that varies smoothly with $\|\nabla\theta\|$. To derive a PDE for the corresponding multi-scale erosion, E denotes an elliptical structuring set, and this set is described by the lengths of its major and minor axes $(\lambda_1, \lambda_2)$ and the angle between its major axis and the x-axis ($\phi$). Points x on the boundary of E satisfy $x^T Q x=1$ where $Q=\mathcal{R}(-\phi)$ $\Lambda^{-2}\mathcal{R}(\phi)$, $\Lambda=\text{diag}(\lambda_1,\lambda_2)$ and $\mathcal{R}(\phi)$ is a clockwise rotation of the plane. The multi-scale erosion defined by this satisfies $$\epsilon_t = \lim_{\Delta t \to 0} \frac{\inf\{\nabla\epsilon^T \Delta x: \Delta x \in \Delta t E\}}{\Delta t}. \tag{35}$$

To simplify the right-hand side of this equation, the transformation $x=Ax'$, with $A=\mathcal{R}(-\phi)\Lambda\mathcal{R}(\phi)'$ is defined. The spatial gradient of $\epsilon$ with respect to x' is then given by the chain rule: $\nabla\epsilon' = A^T\nabla\epsilon$. The transformation A maps the set E to the unit disk (since $x^T Q x = x^T A^T Q A x = x'^T x' = 1$), and as a result, $\inf\{\nabla\epsilon^T\Delta x:\Delta x\in\Delta t E\}=\inf\{\nabla\epsilon'^T\Delta x':\Delta x'\in\Delta t B\}$. Substituting this into Equation 35 and comparing with Equation 28 yields $$\epsilon_t = -\|\nabla\epsilon'\| = -(\nabla\epsilon^T A A^T \nabla\epsilon)^{1/2}. \tag{36}$$

Finally, the addition of the stopping function yields $$\epsilon_t = -g(\rho,\nabla\rho)(\nabla\epsilon^T A A^T \nabla\epsilon)^{1/2}. \tag{37}$$

It is important to note that the non-linear PDEs governing erosion are defined at points where the partial derivatives exist. Even if this is satisfied by the initial data, at finite scales a multi-scale erosion generally develops discontinuities referred to as "shocks". Shocks can be dealt with by replacing standard derivatives by morphological derivatives. They can also be handled using viscosity solutions.

Once the PDE in Equation 26 converges, the desired value of $\phi$ is obtained. The calculation for the R, G, and B channels for the reflection components is straightforward. The diffuse source component, $I_{S_d}$ can be calculated using $$I_{S_d} = \sqrt{I_U^2 + I_V^2}\tan\phi \tag{38}$$

where $[I_{S_d}, I_U, I_V]^T$ is the separated diffuse component in the SUV color space. The SUV and the RGB color spaces are related by a 3×3 rotation matrix R which depends on the color of the light source. The diffuse R, G, and B components of the image are recovered by the simple inversion rotation given by $R^T[I_{S_d}, I_U, I_V]^T$.

To calculate V, assuming $\theta(x,y)$ and $\phi(x,y)$ to be continuous functions derived over the plane, the direction of minimum variation in $\theta$ is orthogonal to the direction of $\nabla\theta$. The two directions orthogonal to the direction of $\nabla\theta$ can be written as $$d_1 = \frac{1}{\|\nabla\theta\|}\begin{bmatrix}-\theta_y \\ \theta_x\end{bmatrix}. \tag{39}$$

$$d_2 = \frac{1}{\|\nabla\theta\|}\begin{bmatrix}\theta_y \\ -\theta_x\end{bmatrix}. \tag{40}$$

In the continuous case the variation in $\theta$ along the directions $d_1$ and $d_2$ are unit tangents to the iso-contour of $\theta$. In the discrete case, the magnitude of change in $\theta$ along the directions $d_1$ and $d_2$ can be different and are represented by $m_1$ and $m_2$. Defining $$\nabla^\perp\theta = m_i d_i \tag{41}$$

where $$i = \arg\min_j m_j \cdot, \nabla^\perp\theta$$

is a vector along the direction of minimum variation in θ with a magnitude equal to the change. By this assumption, the direction of $\nabla^\perp \theta$ is also the direction of minimum variation in albedo.

The direction of V is given by the direction of $\nabla^\perp \theta$. Note that the derivation previously makes no assumptions but the magnitude of V. A scaling of V is introduced to further penalize erosion across large change in albedo. This scaling is analogous to Perona and Malik's (*PAMI*, 12(7):629-639 (1990)) work on anisotropic diffusion. While there are many possible scaling functions, the following form for V is selected:

$$v = \begin{cases} \frac{\nabla^\perp \theta}{\|\nabla^\perp \theta\|} \exp\frac{-\|\nabla^\perp \theta\|^2}{\sigma^2} & \|\nabla \theta\| \neq 0 \\ \nabla \phi & \|\nabla \theta\| = 0 \end{cases} \quad (42)$$

where the parameter σ controls erosion across large albedo change. The velocity field V has three important properties. First, the direction of V is along the direction of minimal albedo change. Second, the term $$\exp\frac{-\|\nabla^\perp \theta\|^2}{\sigma^2}$$

discourages the erosion when the change in albedo is large along $V_{ext}$. And third, the case when $\|\nabla\theta\|$ is zero, corresponds to a uniform albedo region and there is no preferred direction for erosion. Therefore, isotropic erosion given by Equation 28 should be preferred. This is accomplished by setting $V=\nabla\phi$.

The present invention is well adapted for extension to video, which can be treated as a 3D volume I(x,y,z) in which time is the third dimension (z). As in the case of textured images, the direction of $\nabla\theta$ is assumed to be a good local predictor for the direction (in 3D space-time) of maximum diffuse color change. To preserve the component of $\nabla\theta$ along this direction during the erosion process, the erosion of φ is restricted to the iso-surfaces of θ. In the absence of addition information, there is no preferred direction within an iso-surface of θ, so a natural choice of structuring set is a circular disk contained within its tangent plane.

To compute the multi-scale erosion equation, the structuring set described above consists of disk (denoted C) whose surface normal is aligned with $\nabla\theta$. Thus, the maximum projections of $\nabla\phi$ onto the plane that contains this disk is given by $(\|\nabla\phi\|^2 - \|\nabla\hat\theta^T\nabla\phi\|^2)^{1/2}$, and the evolution equation can be simply written as $$\varepsilon_t = \lim_{\Delta t \to 0} \frac{\inf\{\nabla\varepsilon^T \Delta x : \Delta x \in \Delta t C\}}{\Delta t} \quad (43)$$

$$= \lim_{\Delta t \to 0} \frac{-\Delta t (\|\nabla\varepsilon\|^2 - \|\nabla\theta'^T\nabla\varepsilon\|^2)^{1/2}}{\Delta t}$$

$$= (\|\nabla\varepsilon\|^2 - \|\nabla\theta'^T\nabla\varepsilon\|^2)^{1/2},$$

where $\nabla\varepsilon = [\varepsilon_x \varepsilon_y \varepsilon_z]^T$.

Performing some algebraic manipulations, and incorporating the stopping function, produces $$\varepsilon_t = -g(\rho, \nabla\rho)[\nabla\epsilon^T(I_{3\times 3} - \nabla\hat\theta\nabla\hat\theta^T)\nabla\epsilon]^{1/2} \quad (44)$$

Note that the erosion equation for textured and texture-less surfaces are special cases of the erosion equation for videos.

If some a priori information is known, better structuring sets can be designed. An interesting example is when optical flow estimates are available at each location in a video. The relationship $[u(x,y,z) \; v(x,y,z)]^T$ represents the estimated optical flow at location (x,y,z) in the video, so that space-time points (x, y, z) and (x+u, y+v, z+1) correspond to projections of the same surface element. It follows that $\phi_d$ can be estimated by eroding φ along direction $F=[u \; v \; 1]^T$. Using the expression for erosion by a linear set derived in Equation 34 yields:

$$\varepsilon_t = -g(\rho, \nabla\rho)\left|\frac{F^T}{\|F\|}\nabla\varepsilon\right| = -g(\rho, \nabla\rho)\left(\nabla\varepsilon^T \frac{FF^T}{\|F\|^2}\nabla\varepsilon\right)^{1/2} \quad (45)$$

The methods of the present invention were evaluated using images and videos acquired in the laboratory as well as those downloaded from the Internet. Using a known (or approximately known) illuminant color, each image is transformed into SUV space, and the functions ρ, θ, and φ are computed. Specular/diffuse separation is achieved by numerically evolving the appropriate multi-scale erosion PDE with initial condition $\epsilon(x,0)=\phi(x)$. The process is complete when the maximum change in g is below a selected threshold, and this yields an estimate of $\phi_d(x)$, which completely defines the specular and diffuse components. In both still images and videos, erosion is performed along iso-surfaces of θ using Equation 34, and in both cases, texture is preserved while the specularity is removed.

The present invention includes a process for creating visual effects by independently editing separated diffuse and specular components of an image before recombining them. This process is called dichromatic editing. Since the diffuse and specular components often form two distinct components of visual perception, dichromatic editing can achieve a variety of visual effects, including the effects of make-up, surface roughening, and wetness. New images can be composed by adding different proportions of the dichromatic components to achieve different visual affects.

When the source color is uniform in an image or video, the result of separating the diffuse and specular components is a "diffuse image sequence" d(x, y, t) (having multiple color channels) and a monochromatic "specular image sequence" s(x, y, t). Here, t indexes the frames in an image sequence and x and y parameterize the spatial domain of each image frame. In the case of a single image t=1, the signals are two-dimensional instead of three-dimensional.

Dichromatic editing is the process of creating a new multichannel image sequence o(x, y, t) according to $$o(x,y,t)=h(f(d(x,y,t)),g(s(x,y,t))), \quad (46)$$

Where $f(\bullet)$ is a "filtering" or processing operation on the diffuse image sequence, $g(\bullet)$ is a "filtering" or processing operation on the specular image sequence, and $h(\bullet,\bullet)$ is an operation that combines the two together.

An instance of this is a linear combination function $$o(x,y,t)=f(d(x,y,t))+\alpha g(s(x,y,t))L \quad (47)$$

where L is a color vector which could be, but is not necessarily, the source color S. Examples of $f(\bullet)$ and $g(\bullet)$ would include linear filters, non-linear filters such as morphological and median filters, weighted masks, etc.

Figure 10A:
FIGS. 10a-10d are photographic examples of dichromatic editing according to the present invention, where
Figure 10B:
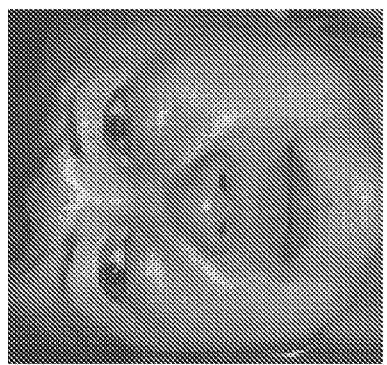
Figure 10C:
Figure 10D:
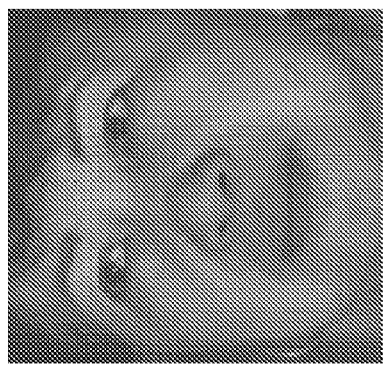

The motivation behind dichromatic editing is that changing the diffuse layer is analogous to changing the albedo of a surface while editing the specular layer is analogous to changing the BRDF. One of the simplest kinds of editing is to compose a new image by adding a different proportion of the specular component to the diffuse component. In a method to change the skin tone in a specular image, the two reflectance components are separated from the image and only the diffuse color is changed, followed by the addition of the specular component. In the example of FIG. 10c, darkening of the skin is achieved by changing the value (i.e., the third HSV channel) of the diffuse component in the HSV space. Skin color can be made fairer by decreasing the saturation of the diffuse component, while the specular component can be added back to give the image a more natural look. In another editing option, sharpening the diffuse component can change the texture of the object in the image. Using the human face as an example, sharpening the diffuse component of the input image in FIG. 10a changes the texture of the face, while sharpening the specular component gives the face a moist appearance, as in FIG. 10b. On human faces, an appearance of makeup can be simulated by smoothing the diffuse layer using a Gaussian filter, as in the example of FIG. 10d, while smoothing the specular layer by Gaussian filtering makes the lighting appear more diffuse.

Figure 11A:
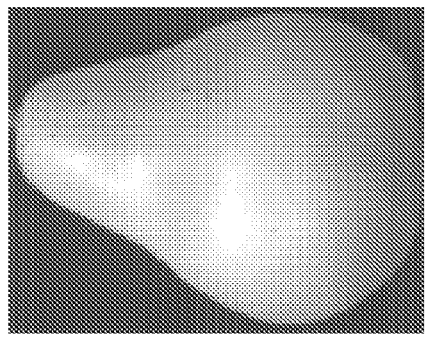
FIGS. 11a-11d are photographic examples of dichromatic editing according to the present invention, where
Figure 11B:
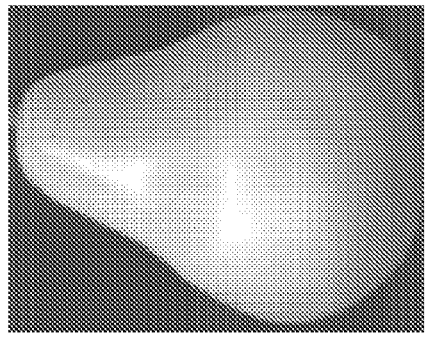
Figure 11C:
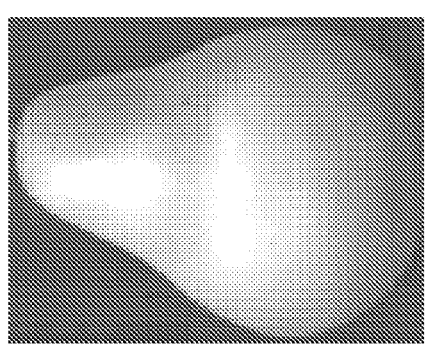
Figure 11D:
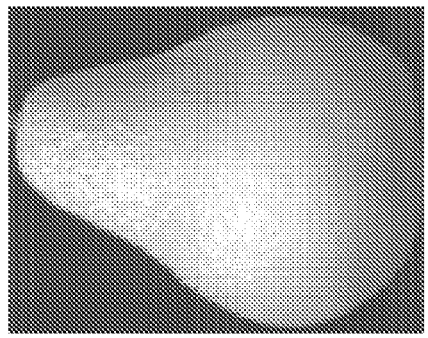

Additional examples of dichromatic editing are provided in FIGS. 11a-11d, where FIG. 11a is the input image of a pear, which is modified to create the image in FIG. 11b by sharpening the specular lobe to give the appearance of a smoother surface. This is achieved by eroding the specular component using a disk-shaped structuring element and amplifying it. FIG. 11c illustrates the input image that was edited to create the effect of an additional light source by exploiting the object symmetry and reflecting the specular component about the vertical axis. Modulating the specular component of the input image results in an avocado-like appearance, as shown in FIG. 11d.

The methods of the present invention provide advantages for a number of applications, including digital video editing and/or enhancement, computer graphics, such as constructing diffuse texture maps for 3-D models, and computer vision as a front-end process for stereo imaging, image segmentation, photometry, image recognition and/or image tracking. While the preferred embodiment of the present invention is software running on a digital computer, the invention can also be implemented in digital hardware and in analog hardware.

Each of the references cited herein are incorporated by reference in its entirety for all purposes.

Other embodiments and modifications of the present invention will readily occur to those of ordinary skill in the art in view of these teachings. Therefore, this invention is to be limited only by the following claims which include all such other embodiments and modifications when viewed in conjunction with the above specification and accompanying drawings.

The invention claimed is:

1. A method for editing a multi-channel image comprising a plurality of pixels, the method comprising:
   inputting one or more multi-channel images into a computer programmed to execute the steps of:
      applying a transformation or filter to the one or more multi-channel images to separate at least a portion of the one or more multi-channel images into a specular component and a diffuse component;
      changing one or more of the separated components; and
      combining the one or more changed separated components with the other separated components to produce an output comprising an edited image.

2. The method of claim 1, wherein the step of changing comprises combining a different proportion of the specular component with the diffuse component.

3. The method of claim 1, wherein the step of changing comprises sharpening one of the specular component and the diffuse component within one of the one or more multi-channel images.

4. The method of claim 1, wherein the step of applying comprises linearly transforming one or more pixels of the one or more multi-channel images into an image in SUV color space.

5. The method of claim 1, wherein the step of applying comprises applying a multiscale morphological filter to the one or more multi-channel images to decompose the one or multi-channel images into diffuse and specular components.

6. The method of claim 5, wherein the multiscale morphological filter comprises a non-linear partial differential equation.

7. The method of claim 1, wherein the step of applying is performed on one pixel or any combination of pixels within the one or more multi-channel images.

8. The method of claim 1, wherein the one or more multi-channel images comprises at least two different images.

9. The method of claim 8, wherein the at least two different images comprise images of an object produced using two or more different light sources.

10. The method of claim 9, wherein the two or more different light sources have different colors.

11. The method of claim 9, wherein the two or more different light sources are at different angles relative to the object.

12. The method of claim 8 wherein the step of changing comprises replacing the separated diffuse component for a combination of pixels within one of the different images with a portion of the separated diffuse component for a combination of pixels from another different image.

13. The method of claim 8 wherein the step of changing comprises replacing the separated specular component for a combination of pixels within one of the different images with a portion of the separated specular component for a combination of pixels from another different image.

14. The method of claim 1, wherein the step of applying comprises:
   transforming the one or more multi-channel images into images in SUV color space; and
   applying a partial differential equation to iteratively erode the specular component of the images using a structuring set, wherein the structuring set is selected to control boundaries of a region in the images to preserve diffuse texture.

15. The method of claim 14, wherein the structuring set is a structuring element selected from a group consisting of two-dimensional disk, two-dimensional line, two-dimensional ellipse, three-dimensional disk, and three-dimensional line.

16. The method of claim 1, wherein the step of changing comprises changing a saturation level within the diffuse component to change a color of an object in the image.

17. The method of claim 1, wherein the step of changing comprises changing a sharpness of the diffuse component to change a texture of an object in the image.

18. The method of claim 17, wherein the step of changing the sharpness comprises filtering the diffuse component with a Gaussian filter.

19. The method of claim 1, wherein the step of changing comprises changing a sharpness of the specular component.

20. The method of claim 19, wherein the step of changing the sharpness comprises filtering the specular component with a Gaussian filter.

21. The method of claim 1, wherein the step of changing comprises eroding the specular component with a structuring element.

22. The method of claim 1, wherein the step of changing comprises modulating the specular component to produce a rough texture.

23. The method of claim 22 wherein modulating the specular component comprises multiplying the specular component pixel-wise by a channel of a second input image.

24. The method of claim 1, wherein the step of changing comprises performing a filtering operation $f(\bullet)$ on the diffuse components $d(x, y, t)$ and a filtering operation $g(\bullet)$ on the specular components $s(x, y, t)$, and wherein the edited image comprises a new multi-channel image $o(x, y, t)$ according to the relationship $o(x, y, t) = h(f(d(x, y, t)), g(s(x, y, t)))$, where $h(\bullet,\bullet)$ is the step of combining.

25. The method of claim 1, wherein the step of changing comprises performing a filtering operation $f(\bullet)$ on the diffuse components $d(x, y, t)$ and a filtering operation $g(\bullet)$ on the specular components $s(x, y, t)$, and wherein the step of combining is performed according to the relationship $o(x, y, t) = \alpha f(d(x, y, t)) + \beta g(s(x, y, t))L$, where L is a color vector, and $\alpha$, $\beta$ are constants that give the proportion of the changed specular and diffuse components.

26. The method of claim 25, the L is the color of the light source.

27. The method of claim 1, wherein the step of applying comprises:
transforming the one or more multi-channel images into images in SUV color space to produce a partial dichromatic separation, wherein the SUV color space comprises a specular channel and two diffuse channels;
re-parameterizing the images in SUV color space using a combination of cylindrical and spherical coordinates $\rho$, $\theta$, and $\phi$, where $\phi$ represents a specular contribution, and $\rho$ and $\theta$ represent diffuse color information; and
applying a non-linear partial differential equation to iteratively erode the specular contribution with time until a change in erosion is less than a pre-selected threshold.

28. The method of claim 27, wherein $\rho$ and $\theta$ correspond to a diffuse shading image component and generalized hue image component, respectively.

29. The method of claim 27, further comprising applying a segmentation algorithm to the generalized hue image component.

30. The method of claim 27, further comprising applying a tracking algorithm to the generalized hue image.

31. The method of claim 27, further comprising applying a recognition algorithm to the generalized hue image.

32. The method of claim 1, wherein the one or more multi-channel images comprise M-color channel images, and wherein the diffuse component comprises (M−1) channels.

33. The method of claim 1, wherein the one or more multi-channel images comprises one or more RGB images having a source color and three channels, and wherein the step of applying comprises:
transforming the one or more RGB images into one or more transformed images comprising one specular channel having the entire specular component of the one or more RGB images and two diffuse channels comprising solely diffuse components of the one or more RGB image, wherein the one specular channel is aligned with the source color.

34. The method of claim 1, wherein the step of changing comprises applying a morphological filter to one or more of the separated components.

35. The method of claim 1, wherein the step of changing comprises applying a weighted mask to one or more of the separated components.

36. The method of claim 1, wherein the step of changing comprises applying a median filter to one or more of the separated components.

37. The method of claim 1, wherein the step of changing comprises applying a morphological filter to one or more of the separated components.

38. The method of claim 1, wherein the step of changing comprises applying a linear filter to one or more of the separated components.

39. The method of claim 1, wherein the step of changing comprises applying a non-linear filter to one or more of the separated components.

40. The method of claim 1, wherein an object in the image is symmetrical and the step of changing comprises reflecting the specular component around an axis of symmetry.

41. The method of claim 1, wherein the step of changing comprises applying color transformation to the diffuse component.

42. The method of claim 41, wherein the step of applying a color transformation to the diffuse component comprises multiplying the color of each pixel by a three by three matrix.

43. A method for editing a multi-channel image comprising a plurality of pixels, the method comprising:
inputting a combination of pixels from each of two or more multi-channel images into a computer programmed to execute the steps of:
applying a transformation or filter to the combinations of pixels from the two or more multi-channel images to separate the specular and diffuse components for each combination of pixels;
combining the separated diffuse component from one combination of pixels with the separated specular component of the one or more other combinations of pixels to produce an output comprising an edited image.

44. The method of claim 43, wherein the two or more multi-channel images comprise images of an object produced using two or more different light sources.

45. The method of claim 44, wherein the two or more different light sources have different colors.

46. The method of claim 44, wherein the two or more different light sources are at different angles relative to the object.

47. The method of claim 43 wherein the step of changing comprises replacing the separated diffuse component for a combination of pixels within one of the different images with a portion of the separated diffuse component for a combination of pixels from another different image.

48. The method of claim 43 wherein the step of changing comprises replacing the separated specular component for a combination of pixels within one of the different images with a portion of the separated specular component for a combination of pixels from another different image.

49. The method of claim 43, wherein the step of changing comprises combining a different proportion of the specular component with the diffuse component.

50. The method of claim 43, wherein the step of changing comprises sharpening one of the specular component and the diffuse component within one of the combinations of pixels.

51. The method of claim 43, wherein the step of applying comprises:

transforming the one or more multi-channel images into images in SUV color space; and applying a partial differential equation to iteratively erode the specular component of the images using a structuring set, wherein the structuring set is selected to control boundaries of a region in the images to preserve diffuse texture.

52. The method of claim 51, wherein the structuring set is selected from a group consisting of two-dimensional disk, two-dimensional line, two-dimensional ellipse, three-dimensional disk, and three-dimensional line.

53. The method of claim 43, wherein the step of changing comprises applying a morphological filter to one or more of the separated components.

54. The method of claim 43, wherein the step of changing comprises applying a weighted mask to one or more of the separated components.

55. The method of claim 43, wherein the step of changing comprises applying a median filter to one or more of the separated components.

56. The method of claim 43, wherein the step of changing comprises applying a morphological filter to one or more of the separated components.

57. The method of claim 43, wherein the step of changing comprises applying a linear filter to one or more of the separated components.

58. The method of claim 43, wherein the step of changing comprises applying a non-linear filter to one or more of the separated components.

59. The method of claim 43, wherein an object in the image is symmetrical and the step of changing comprises reflecting the specular component around an axis of symmetry.

60. The method of claim 43, wherein the step of changing comprises applying color transformation to the diffuse component.

61. The method of claim 60, wherein the step of applying a color transformation to the diffuse component comprises multiplying the color of each pixel of the combination of pixels by a three by three matrix.

* * * * *